US011566151B2

(12) United States Patent
Wang et al.

(10) Patent No.: US 11,566,151 B2
(45) Date of Patent: Jan. 31, 2023

(54) PHOTO-CURABLE LIQUID OPTICALLY CLEAR ADHESIVE COMPOSITION AND THE USE THEREOF

(71) Applicant: Henkel AG & Co. KGaA, Duesseldorf (DE)

(72) Inventors: Hongyu Wang, Shanghai (CN); Xin Wang, Shanghai (CN); Junichi Sawanobori, Kanagawa (JP); Chunfu Chen, Kanagawa-ken (JP); Daoqiang Lu, Chandler, AZ (US); Victor Xinya Lu, Marietta, GA (US)

(73) Assignee: Henkel AG & Co. KGaA, Duesseldorf (DE)

( * ) Notice: Subject to any disclaimer, the term of this patent is extended or adjusted under 35 U.S.C. 154(b) by 1431 days.

(21) Appl. No.: 15/405,483

(22) Filed: Jan. 13, 2017

(65) Prior Publication Data
US 2017/0121562 A1 May 4, 2017

Related U.S. Application Data

(63) Continuation of application No. PCT/CN2014/082388, filed on Jul. 17, 2014.

(51) Int. Cl.
| *C09J 4/06* | (2006.01) |
| *B32B 7/12* | (2006.01) |
| *B32B 27/20* | (2006.01) |
| *B32B 27/30* | (2006.01) |
| *B32B 27/22* | (2006.01) |
| *C03C 17/32* | (2006.01) |
| *B32B 17/00* | (2006.01) |
| *C09J 5/00* | (2006.01) |

(52) U.S. Cl.
CPC .............. *C09J 4/06* (2013.01); *B32B 7/12* (2013.01); *B32B 17/00* (2013.01); *B32B 27/20* (2013.01); *B32B 27/22* (2013.01); *B32B 27/308* (2013.01); *C03C 17/32* (2013.01); *C09J 5/00* (2013.01); *B32B 2307/412* (2013.01); *B32B 2333/08* (2013.01); *B32B 2457/20* (2013.01); *C03C 2218/114* (2013.01); *C09J 2433/00* (2013.01)

(58) Field of Classification Search
CPC ...... C09J 4/06; C09J 5/00; B32B 7/12; B32B 17/00; B32B 27/20; B32B 27/22; B32B 27/308; C03C 17/32
USPC ..................................................... 156/275.5
See application file for complete search history.

(56) References Cited

U.S. PATENT DOCUMENTS

| 5,548,038 A | 8/1996 | Enami et al. |
| 7,297,400 B2 | 11/2007 | Yang et al. |
(Continued)

FOREIGN PATENT DOCUMENTS

| CN | 103396741 | 11/2013 |
| JP | 2014129469 | 7/2014 |
(Continued)

OTHER PUBLICATIONS

International Search Report issued in connection with International Patent Application No. PCT/CN2014/082388 dated Mar. 30, 2015.

*Primary Examiner* — Daniel McNally
(74) *Attorney, Agent, or Firm* — Steven C. Bauman (57) ABSTRACT

The present invention relates to a photo-curable liquid optically clear adhesive composition, to a cured adhesive and an article produced therefrom, and to the use thereof.

31 Claims, 3 Drawing Sheets

(56) References Cited

U.S. PATENT DOCUMENTS

2014/0262002 A1* 9/2014 Suwa .................. C09J 7/00
                                                156/249
2014/0315036 A1   10/2014 Kobayashi et al.

FOREIGN PATENT DOCUMENTS

| KR | 20130040591 | 4/2013 |
|----|-------------|--------|
| KR | 20130041488 | 4/2013 |
| WO | 2009045889  | 4/2009 |
| WO | 2009086492  | 7/2009 |
| WO | 2013013568  | 1/2013 |
| WO | 2013013598  | 1/2013 |
| WO | 2013049133  | 4/2013 |
| WO | 2013069281  | 5/2013 |
| WO | 2013173977  | 11/2013 |
| WO | 2013181030  | 12/2013 |

* cited by examiner

PHOTO-CURABLE LIQUID OPTICALLY CLEAR ADHESIVE COMPOSITION AND THE USE THEREOF

TECHNICAL FIELD

The present invention generally relates to the field of a photo-curable adhesive using for optical displays. In particular, the present invention relates to a photo-curable liquid optically clear adhesive composition, to a cured adhesive and an article produced therefrom, and to the use thereof.

BACKGROUND

Photo-curable optically clear adhesives and especially photo-curable liquid optically clear adhesives (LOCAs) are finding wide applications in optical bonding for optical electronic devices, such as optical displays. Optical bonding in display applications is used to bond optical elements such as display panels, glass plates, touch panels, diffusers, rigid compensators, heaters, and flexible films such as polarizers and retarders. Especially the use of such adhesives for bonding in touch displays, for example, capacitive touch displays is of high interest.

The importance of optically clear adhesives is still growing since the continuous development of new electronic display products, such as wireless reading devices, increases the demands for optically clear adhesives. However, there are still some challenges to be mastered, for example one problem for the optically clear adhesive is overflow control. Current methods of applying LOCAs either comprise the use of a dispensable fluid, which involves flowable liquid OCAs such that they behave like a Newtonian fluid. To prevent flow beyond the desired printing area, the use of a pre-cured dam material (so called "damming process") is often required. This process consists of two steps. At first, the adhesive is applied to the edge of the required area by a dispensing nozzle followed be UV or LED curing. The second step is to fill the area inside the dam with a liquid optically clear adhesive. This process remains suboptimal because it needs two steps. Above that, boundary between dam and fill is always a challenge. Another possibility to overcome the problem of overflowing adhesive is the use of optically clear tapes, which is for example disclosed in US 7297400 B2. However, such process may easily lead to a reduced optical performance due to air gaps or bubbles which for example can reduce brightness and contrast of the display.

Recently, a new process for binding a top substrate was developed called pre-gelling process followed by a full curing process, as described in WO 2013/173977 A1. This process could overcome the problem of adhesive overflow. However, the process is complicated, and difficult to laminate non-transparent substrates. Additionally, a second full curing step cannot penetrate into shadow area of the panels. Therefore, a side curing process may need to fully cure the edge area.

There is thus still a need to develop new photo-curable adhesives for optical bonding, which have improved tackiness after curing to prevent the overflow of adhesive and could be used as a pressure sensitive adhesive film without final curing.

SUMMARY OF THE INVENTION

It is one aspect of the present invention to provide a photo-curable liquid optically clear adhesive composition, comprising:

(a) at least one (meth)acrylic copolymer having a weight average molecular weight of from about 10000 to about 600000 g/mol and a glass transition temperature of from about −40° C. to about 40° C., wherein the (meth)acrylic copolymer is a reaction product of the monomers selected from the group consisting of a (meth)acrylamide monomer, a hydroxyl group containing (meth)acrylic monomer, a $C_1$-$C_{20}$ alkyl (meth)acrylate and combination thereof, (b) at least one non-functional (meth)acrylic monomer, (c) at least one photo initiator, and (d) at least one functional (meth)acrylic monomer.

Surprisingly, the photo-curable liquid optically clear adhesive composition is transparent and possess an appropriate viscosity which can be well applied by slit coaters, and after photo-curing combines, it exhibits excellent properties of hardness, haze, yellowness, transmittance and tackiness.

According to another aspect, the present invention provides a curing method, comprising curing the photo-curable liquid optically clear adhesive composition by exposure to electromagnetic radiation having a wavelength ranging from 200 nm to 500 nm to a curing ratio of at least about 95%.

According to yet another aspect, the present invention provides a laminating process for binding a top substrate to a base substrate, comprising:

(a) applying the photo-curable liquid optically clear adhesive composition according to the present invention onto the top side of the base substrate, (b) curing the photo-curable liquid optically clear adhesive composition by exposure to electromagnetic radiation having a wavelength ranging from 200 nm to 500 nm to a curing ratio of at least about 95%, and (c) attaching the top substrate on the cured adhesive layer of step (b).

According to yet another aspect, the present invention provides a cured adhesive produced from the adhesive composition as above.

According to yet another aspect, the present invention provides an article comprising the adhesive composition or the cured adhesive as above.

According to yet another aspect, the present invention provides the use of the adhesive composition or the cured adhesive as above for bonding or laminating parts on substrates, preferably on glass substrates, more preferably on assembling transparent or non-transparent parts of substrates.

Other features and aspects of the subject matter are set forth in greater detail below.

DETAILED DESCRIPTION

It is to be understood by one of ordinary skill in the art that the present discussion is a description of exemplary embodiments only, and is not intended as limiting the broader aspects of the present invention.

The improved photo-curable liquid optically clear adhesive composition according to one aspect of the present invention comprises:

(a) at least one (meth)acrylic copolymer having a weight average molecular weight of from about 10000 to about 600000 g/mol and a glass transition temperature of from about −40° C. to about 40° C., wherein the (meth)acrylic copolymer is a reaction product of the monomers selected from the group consisting of a (meth)acrylamide monomer, a hydroxyl group containing (meth)acrylic monomer, a $C_1$-$C_{20}$ alkyl (meth)acrylate and combination thereof, (b) at least one non-functional (meth)acrylic monomer, (c) at least one photo initiator, and (d) at least one functional (meth)acrylic monomer.

The photo-curable liquid optically clear adhesive composition according to the present invention possesses a Brookfield viscosity at 25° C. is from about 1000 to about 100000 mPa·s, preferably from about 1500 to about 50000 mPa·s, measured according to ASTM D1084. As such, the photo-curable liquid optically clear adhesive is very suitable for the application using by for example a slit coater.

By using the photo-curable liquid optically clear adhesive composition according to the present invention, it is easy to control the edge flow through a curing ratio at least about 95% on substrates, and thus avoid using a dam for filling LOCA.

The adhesive composition also remains better optical performance compared with traditional optically clear tapes, which easily generate air gaps and bubbles.

The adhesive composition also solve the shadow curing issue in optical displays, in which substrates are partially coated with ink, and UV rays and LED light cannot penetrate in to initiate the photo polymerization process. Thus, side curing issue compared with traditional LOCA is avoided, and no second final curing is needed due to the high conversion rate for the first curing.

The prepared adhesive composition is a very tacky formulations after curing, which benefits and improves the adhesion on substrates during autoclave process.

As used herein, the term "liquid optically clear photo-curable adhesive" is well established in the art and well known to a person skilled in the art. Liquid optically-clear adhesive (LOCA) is widely used in touch panels and display devices to bind the cover lens, plastic or other optical materials to the main sensor unit or to each other. Liquid optically-clear adhesives are generally used to improve the optical characteristics of the device as well as improve other attributes such as durability. The liquid optically clear photo-curable adhesive is generally used for example to bond the touch panel to the main liquid crystal display, and also to bond any protective cover, such as the lens, to the touch panel. Major applications of liquid optically clear photo-curable adhesive include capacitive touch panels, 3D televisions and glass retarders. In particular the adhesive is optically clear, if it exhibits an optical transmission of at least about 85%. The measurement of optical transmission is known to the person skilled in the art. It can preferably be measured on a 100 μm thick sample according to the following preferred testing method. A small drop of optically clear adhesive is placed on a 75 mm by 50 mm plain micro slide (a glass slide from Dow Corning, Midland, Mich.), that had been wiped three times with isopropanol and has two 100μm thick spacer tapes attached on its two ends. A second glass slide is attached onto the adhesive under a force. Then the adhesive is fully cured under a UV source. The optical transmission is measured from wavelength 380 nm to 780 nm with a spectrometer Cary 300 from Agilent. One blank glass slide is used as background.

As used herein, the term "(meth)acrylic copolymer" refers to methacrylic copolymer and acrylic copolymer both. As used herein, the term "(meth)acrylamide" refers to methacrylamide and acrylamide both. As used herein, the term "(meth)acrylate" refers to methacrylate and acrylate both.

As used herein, the term "$C_1$-$C_{20}$ alkyl" refers to linear or branched and is, for example, $C_1$-$C_{18}$-, $C_1$-$C_{12}$-, $C_1$-$C_8$-, $C_1$-$C_6$- or $C_1$-$C_4$ alkyl. Examples thereof are methyl, ethyl, propyl, isopropyl, n-butyl, sec-butyl, isobutyl, tert-butyl, pentyl, hexyl, heptyl, 2,4,4-trimethylpentyl, 2-ethylhexyl, octyl, nonyl, decyl, undecyl, dodecyl, hexadecyl, octadecyl and eicosyl.

As used herein, the terms "$C_1$-$C_{12}$ alkyl", "$C_1$-$C_{10}$ alkyl", "$C_1$-$C_8$ alkyl", "$C_1$-$C_6$ alkyl" and "$C_1$-$C_4$ alkyl" also refer to linear or branched and have, for example, the meanings given above up to the corresponding number of carbon atoms.

As used herein, the term "Tg" refers to the glass transition temperature of a polymer. This is defined as the temperature at which the amorphous domains of the polymer take on the brittleness, stiffness, and rigidity characteristic of the glassy state. For polymers, this temperature is typically determined by DSC (differential scanning calorimetry) according to the standard ASTM E1356, for example, with temperature increase slopes of 20° C. per minute.

As used herein, the term "weight average molecular weight" refers to a particular measure of the molecular weight of a polymer. The weight average molecular weight is calculated as follows: determine the molecular weight of a number of polymer molecules; add the squares of these weights; and then divide by the total weight of the molecules. The weight average molecular weight can be measured by gel permeation chromatography according to EN ISO 13885, using a polystyrene standard for calibration.

(Meth)acrylic Copolymer

The photo-curable liquid optically clear adhesive composition of the present invention comprises at least one (meth)acrylic copolymer (a) which is a reaction product of the monomers selected from the group consisting of a (meth)acrylamide monomer, a hydroxyl group containing (meth)acrylic monomer, an $C_1$-$C_{20}$ alkyl (meth)acrylate and combination thereof.

The (meth)acrylamide monomer represents a compound according to the following formula:

wherein $R^1$ represents a hydrogen atom or a methyl group; and $R^2$ and $R^3$ each represent a hydrogen atom or an alkyl group having 1 to 20 carbon atoms which can be substituted with a substituent except for an acid group, or $R^2$ and $R^3$ may combine chemically to form a heterocyclic ring having 4 to 20 carbon atoms, or $R^2$ and $R^3$ may form a cyclic structure having at least one atom selected from the group consisting of a nitrogen atom, an oxygen atom and a sulfur atom and having 4 to 19 carbon atoms.

Examples of the (meth)acrylamide monomer in the present invention include but not limited to (meth)acrylamide, N-alkyl(meth)acrylamide (in which "alkyl" may be methyl, ethyl, propyl, isopropyl, butyl, isobutyl, t-butyl, heptyl, octyl, ethylhexyl, cyclohexyl, or hydroxyethyl), N-aryl (meth)acrylamide (in which "aryl" may be phenyl, toll, nithenyl, naphthyl, or hydroxyphenyl), N,N-dialkyl(meth) acrylamide (in which "alkyl" may be methyl, ethyl, propyl, isopropyl, butyl, isobutyl, t-butyl, heptyl, octyl, ethylhexyl, cyclohexyl, or hydroxyethyl), N,N-diaryl(meth)acrylamide (in which "aryl" may be phenyl), N-methyl-N-phenyl(meth)acrylamide, N-hydroxyethyl-N-methyl(meth)acrylamide, N-2-acetamide, ethyl -N-acetyl (meth) acrylamide, N-(phenylsulfonyl)(meth)-acrylamide, N-(p-methylphenylsulfonyl) (meth)acrylamide, 2-(or 3- or 4-)hydroxyphenylacrylamide, N-(meth)acryloylmorpholine, 1-vinylinnidazole, 1-vinyl-2-nnethylimidazole, 1-vinyltriazole, 1-vinyl-3,5-dimethylimidazole, vinylpyrrolidone, 4-vinylpyridine, and vinylcarbazole.

In one embodiment of the present invention, the (meth)acrylamide monomer for component (a) is selected from the group consisting of caprolactone (meth)acrylate, N,N-dimethyl (meth)acrylamide, N-methyl (meth)acrylamide, N-isopropyl (meth)acrylamide, N-butoxymethyl (meth)acrylamide, N-t-butyl (meth)acrylamide, N-phenyl (meth)acrylamide and N-methylol (meth)acrylamide, N-(meth)acryloylmorpholine, N-(meth)acryloylpyrrolidone, N-(meth)acryloylpiperidine, N-(meth)acryloylpyrrolidine, N-(meth)acryloyl-4-piperidone and the combination thereof. Preferably, the (meth)acrylic monomer is N-(meth)acryloylmorpholine, particularly, N-acryloylmorpholine.

The hydroxyl group containing (meth)acrylic monomer other than the monomer as above may include such as (meth)acrylates containing one hydroxyl group, especially hydroxyalkyl(meth)acrylates, the ethoxylated and/or propoxylated derivatives thereof, the adducts thereof with lactones, polyalkoxy monohydroxy mono(meth)acrylates. Particularly preferred are hydroxyalkyl(meth)acrylates having from 1 to 20 carbon atoms in the alkyl group, the ethoxylated and/or propoxylated derivatives thereof, the adducts thereof with lactones, polyalkoxy monohydroxy mono(meth)acrylates. Examples of such compounds comprise hydroxyethyl(meth)acrylate, hydroxypropyl(meth)acrylate, hydroxybutyl(meth)acrylate, hydroxypentyl (meth) acrylate, hydroxyheptyl (meth)acrylate, hydroxynonyl (meth)acrylate, hydroxydecyl(meth)acrylate, their position isomers, the ethoxylated and/or propoxylated derivatives thereof, the adducts thereof with lactones, diethylene glycol mono(meth)acrylate, polyethylene glycol mono(meth)acrylate, propylene glycol mono(meth)acrylate, polypropylene glycol mono(meth)acrylate.

In one embodiment of the present invention, the (meth)acrylic monomer for component (a) is selected from the group consisting of hydroxylalkyl (meth)acrylates, the ethoxylated and propoxylated derivatives thereof, the adducts thereof with lactones and polyalkoxy monohydroxyl mono(meth)acrylates, preferably hydroxylalkyl (meth)acrylates having from 1 to 20 carbon atoms in the alkyl group, the ethoxylated and/or propoxylated derivatives thereof, the adducts thereof with lactones and polyalkoxy monohydroxyl mono(meth)acrylates, more preferably from a group consisting of β-carboxyethyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, (meth)acrylate of glycidyl versatate, and mixture thereof. Preferably, the hydroxyl group containing (meth)acrylic monomer is 2-hydroxyethyl (meth)acrylate and/or 2-hydroxybutyl (meth)acrylate.

In the case that the monomers of the (meth)acrylic copolymer include a hydroxyl group containing (meth)acrylic monomer, the (meth)acrylic copolymer may be further grafted by a ring opening reaction with a cyclic compound. The ring opening reaction grafts the cyclic compound onto the (meth)acrylic polymer backbone. The cyclic compound is grafted at the hydroxyl group of the (meth)acrylic polymer backbone. The cyclic compound having at least one functional group X in the cyclic structure, where X is —O— or —NH—. Preferred cyclic compounds include lactones, lactams, lactides, cyclic carbonates and mixtures thereof. Preferred cyclic compounds are lactones and lactides and mixtures thereof. Particularly preferred are lactones such as L(−)lactide, ε-caprolactone, δ-valerolactone, γ-butyrolactone, and lactones of hydroxycarboxylic acids such as 2-hydroxycarboxylic acids, e.g. glycolic acid and lactic acid, 3-hydroxycarboxylic acids, e.g. 3-hydroxypropionic acid, 3-hydroxybutyric acid, 3-hydroxyvaleric acid and hydroxypivalic acid. More preferred are ε-caprolactone, δ-valerolactone, γ-butyrolactone and mixtures thereof, most preferred is ε-caprolactone.

The ring opening step is generally carried out at room temperature to up to about 150° C. The ring opening reaction can take place without the use of a catalyst, but the reaction rate can be increased with the addition of the catalyst. Therefore, the ring opening reaction preferably takes place in the presence of at least one catalyst. Suitable catalysts include alkali or alkaline earth metal alkoxides, organic acids, inorganic acids and Lewis acids such as sodium methoxide, calcium methoxide, aluminum isopropoxide, tetraalkyl titanates, titanium chelates, titanium acylates, lead salts, lead oxides, zinc borate, antimony oxide, stannous octoate, tin laurate, tin octoate, dibutyl tin dilurate, sulfuric acid, hydrochloric acid, phosphoric acid, boron trifluoride. Another preferred catalyst include yttrium alkoxides and lanthanum alkoxides, both of which can be used to carry out the ring opening step at room temperature. The catalyst can be used in amounts of up to about 1% based on the sum of the hybrid copolymer mixture.

The $C_1$-$C_{20}$ alkyl (meth)acrylate monomer for component (a) in the present invention refers to an alkyl (meth)acrylate monomer having from 1 to 20, preferably from 1 to 12, more preferably from 1 to 8 carbon atoms in the alkyl group. The term "alkyl" refers to saturated aliphatic groups including straight-chain, branched-chain and cyclic groups. Examples of $C_1$-$C_{20}$ alkyl groups include but not limited to methyl (meth)acrylate, ethyl (meth)acrylate, propyl (meth)acrylate, butyl (meth)acrylate, pentyl (meth)acrylate, hexyl (meth) acrylate, heptyl (meth)acrylate, octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth) acrylate, nonadecyl (meth)acrylate, eicosyl (meth)acrylate, isopropyl (meth)acrylate, isobutyl (meth)acrylate, isopentyl (meth)acrylate, isohexyl (meth)acrylate, isoheptyl (meth) acrylate, isooctyl (meth)acrylate, 2-ethylhexyl (meth)acrylate, sec-butyl (meth)acrylate, 1-methylbutyl (meth)acrylate, 1-ethylpropyl (meth)acrylate, cyclopropyl (meth)acrylate, cyclobutyl (meth)acrylate, cyclopentyl (meth)acrylate, cyclohexyl (meth)acrylate, cyclooctyl (meth)acrylate, methoxymethyl (meth)acrylate, methoxyethyl (meth)acrylate, ethoxymethyl (meth)acrylate, ethoxyethyl (meth)acrylate and isomers thereof.

In one embodiment, the $C_1$-$C_{20}$ alkyl (meth)acrylate monomer for component (a) in the present invention is selected from the group consisting of methyl (meth)acrylate, n-butyl (meth)acrylate, iso-butyl (meth)acrylate, 2-ethylhexyl (meth)acrylate, iso-decyl (meth)acrylate, iso-octyl (meth)acrylate, iso-stearyl (meth)acrylate, lauryl (meth)

acrylate, n-stearyl (meth)acrylate, isobornyl (meth)acrylate, dicyclopentenyloxyethyl (meth)acrylate, 2-(2-ethoxyethoxy)ethyl (meth)acrylate, cyclohexyl (meth)acrylate and combination thereof. Preferably, the $C_1$-$C_{20}$ alkyl (meth)acrylate monomer is 2-ethylhexyl (meth)acrylate and/or isobutyl methacrylate.

According to the present invention, the (meth)acrylic copolymer of component (a) has a weight average molecular weight of from about 10000 to about 600000 g/mol, preferably from about 30000 to about 300000 g/mol, and more preferably from about 50000 to about 200000 g/mol.

According to the present invention, the (meth)acrylic copolymer of component (a) has a glass transition temperature of from about −40° C. to about 40° C., preferably from about −35° C. to about 30° C. measured by DSC according to standard ASTM E1356.

In the photo-curable liquid optically clear adhesive composition according to the present invention, the amount of component (a) is from about 30 to about 95% by weight, preferably from about 50 to about 90% by weight, based on the total weight of the adhesive composition.

In one particular embodiment, the (meth)acrylic copolymer of component (a) is a reaction product of the monomers selected from at least two of the group consisting of 2-ethylhexyl (meth)acrylate, N-(meth)acryloyl morpholine, isobutyl (meth)acrylate and 2-hydroxylbutyl (meth)acrylate, 2-hydroxyethyl (meth)acrylate, for example 2-ethylhexyl acrylate and 2-hydroxylbutyl acrylate; 2-ethylhexyl acrylate, isobutyl methacrylate and 2-hydroxylbutyl acrylate; isobutyl methacrylate and 2-hydroxylbutyl acrylate; and N-acryloyl morpholine and 2-ethylhexyl acrylate.

Non-Functional (meth)acrylic Monomer

The photo-curable liquid optically clear adhesive composition according to the present invention comprises at least one non-functional (meth)acrylic monomer (b). The non-functional (meth)acrylic monomer (b) suitable for the present invention is not limited, and selected from the group consisting of mono-, di-, tri- and tetra-(meth)acrylic monomers, preferably n-butyl (meth)acrylate, iso-butyl (meth)acrylate, 2-ethylhexyl (meth)acrylate, iso-decyl (meth)acrylate, iso-octyl (meth)acrylate, iso-stearyl (meth)acrylate, lauryl (meth)acrylate, stearyl (meth)acrylate, isobornyl (meth)acrylate, caprolactone (meth)acrylate, N-(meth)acryloyl morpholine, dicyclopentenyloxyethyl (meth)acrylate, dicyclopentadienyl (meth)acrylate, 2-(2-ethoxyethoxy)ethyl (meth)acrylate, methoxy polyethylene glycol (meth)acrylate, cyclohexyl (meth)acrylate, 2-phenoxyethyl (meth)acrylate, benzyl (meth)acrylate, tetramethylene di(meth)acrylate, ethylene di(meth)acrylate, cyclohexanedimethylol di(meth)acrylate, dicyclopentadienedinnethylol di(meth)acrylate, 1,6-hexanediol di(meth)acrylate, nonanediol di(meth)acrylate, tricyclodecane dimethanol di(meth)acrylate, 1,4-butanediol di(meth)acrylate, trimethylolpropane tri(meth)acrylate, pentaerythritol tri(meth)acrylate, pentaerythritol tetra(meth)acrylate, and combination thereof.

Preferably, the non-functional (meth)acrylic monomer (b) is selected from the group consisting of 2-(2-ethoxyethoxy)ethyl (meth)acrylate, pentaerythritol tetra(meth)acrylate, isobornyl (meth)acrylate, benzyl (meth)acrylate, 2-ethylhexyl (meth)acrylate, tricyclodecane dimethanol di(meth)acrylate, and combination thereof.

In the photo-curable liquid optically clear adhesive composition according to the present invention, the amount of non-functional (meth)acrylic monomer (b) is from about 2 to about 60% by weight, preferably from about 10 to about 50% by weight, based on the total weight of the adhesive composition.

Functional (meth)acrylic Monomer

The photo-curable liquid optically clear adhesive composition according to the present invention also comprises at least one functional (meth)acrylic monomer (d). As used herein, the functional (meth)acrylic monomer refers to those having at least one functional group selected from a hydroxyl, an amide, a carboxyl, a tetrahydrofurfuryl, a morpholine, an amino, and an isocyanate group. Specific examples of such functional (meth)acrylic monomer are (meth)acryloyl morphiline, caprolactone acrylate, and tetrahydrofurfuryl acrylate.

Preferably, the functional (meth)acrylic monomer (d) is selected from the group consisting of (meth)acryloyl morphiline, caprolactone acrylate, tetrahydrofurfuryl acrylate, and combination thereof.

In the photo-curable liquid optically clear adhesive composition according to the present invention, the amount of functional (meth)acrylic monomer (d) is about 0.5 to about 30% by weight, preferably about 1 to about 10% by weight, based on the total weight of the adhesive composition.

Photo Initiator

The photo-curable liquid optically clear adhesive composition according to the present invention also comprises at least one photo initiator (c) for initiating the photo-curing of the adhesive composition according to the present invention after application.

The photo initiator which can be used in the present invention includes but not limited to acetophenones, preferably 2-hydroxyl-2-methylpropiophenone and 1-hydroxycyclohexyl phenyl ketone, acylphosphine oxides, preferably bis(2,4,6-trimethylbenzoy)phenylphosphine oxide, benzoin ethers, preferably benzoin methyl ether and benzoin ethyl ether. The photo initiator can be used singly or in combination of two or more photo initiators. Specific examples are 2,4-bis(dodecylthiomethyl)-6-methylphenol, trimethylbenzoyl diphenylphosphine oxide, 1-hydroxycyclohexyl benzophenone, 1-[4-(2-hydroxyethoxy)-phenyl]-2-hydroxy-2-methyl-1-propane-1-one, and combination thereof.

Photo initiator (c) is present in the photo-curable liquid optically clear adhesive composition in an amount of from about 0.02 to about 5% by weight, preferably from about 0.5 to about 4.0% by weight, based on the total weight of the adhesive composition.

Additive

Various additives may be optionally added to the photo-curable liquid optically clear adhesive composition of the present invention as other optional components inasmuch as the object and the effect of the present invention are not adversely effected. Examples of such additives include polymers or oligomers such as epoxy resin, polyamide, polyamideimide, polyurethane, polybutadiene, polychloroprene, polyether, polyester, styrene-butadiene block copolymer, petroleum resin, xylene resin, ketone resin, cellulose resin, fluorine-containing oligomer, silicone-containing oligomer, and polysulfide oligomer, polymerization inhibitors such as phenothiazine and 2,6-di-t-butyl-4-methylphenol, polymerization initiation adjuvant, leveling agents, wettability improvers, surfactants, plasticizers, UV absorbers, silane coupling agents, inorganic fillers, pigments, dyes, and the like. In one embodiment of the present invention, the photo-curable liquid optically clear adhesive composition further contains polyethylene glycol di-2-ethylhexoate as plasticizer.

In another aspect, the present invention provides a curing method, comprising curing the photo-curable liquid optically clear adhesive composition by exposure to electromagnetic radiation having a wavelength ranging from 200 nm to 500 nm to a curing ratio of at least about 95%, preferably 97%, more preferably 99%, most preferably 99.5%.

In yet another aspect, the present invention provides a laminating process for binding a top substrate to a base substrate, comprising:

(a) applying the photo-curable liquid optically clear adhesive composition according to the present invention onto the top side of the base substrate, (b) curing the photo-curable liquid optically clear adhesive composition by exposure to electromagnetic radiation having a wavelength ranging from 200 nm to 500 nm to a curing ratio of at least about 95%, and (c) attaching the top substrate on the cured adhesive layer of step (b).

This process allows the lamination on non-transparent substrates, since the curing step with high conversion rate takes place on adhesive surface directly.

Figure 1:
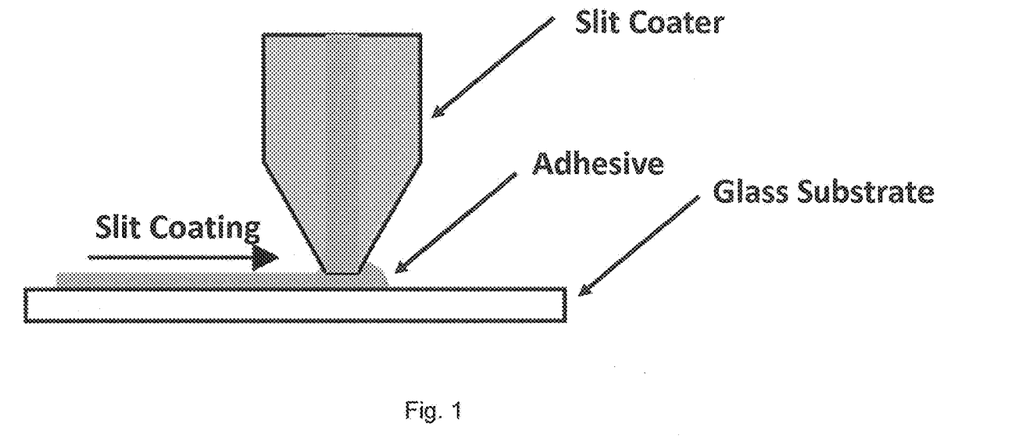
FIG. 1 depicts the application of LOCAs on the top substrate in step (a) of the laminating process according to the present invention.

The application of the photo-curable adhesive in step (a) on the top side of the base substrate, which can be a display panel, can be done in a conventional way, for example by a single or multi nozzle or a slit coater. In step (a), as shown in FIG. 1, a photo-curable liquid optically clear adhesive is applied onto the top side of the base substrate such that preferably a 50 µm to 600 µm thick layer of a LOCA is obtained. Preferably, a continuous layer of the adhesive is obtained.

Figure 2:
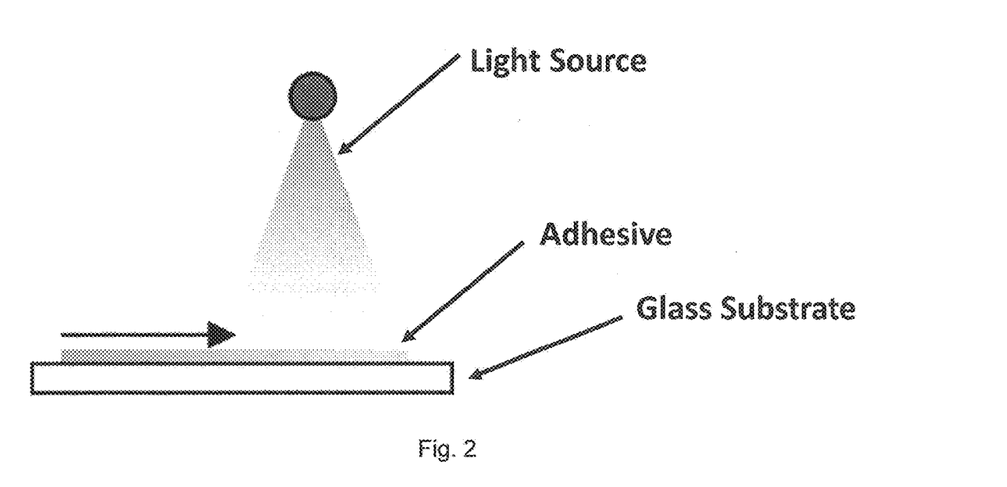
FIG. 2 depicts the curing in step (b) of the laminating process according to the present invention.

The curing in step (b) results in a highly gelled adhesive (like a pressure sensitive adhesive film), as shown in FIG. 2. Preferably, the LOCA is instantly gelled by exposure to electromagnetic radiation with UV or LED light sources (comprising a wavelength ranging from 200 nm to 500 nm). "Instantly" means that the irradiation with electro-magnetic radiation having a wavelength ranging from 200 nm to 500 nm should start within a few seconds after applying the adhesive on the base substrate, for example within 10 seconds or within 5 seconds after applying the adhesive composition. Thus, the gelling starts before the adhesive will spread widely. The liquid optically clear photo-curable adhesive should be cured to a high curing ratio of at least about 95% to build up enough viscosity so that the applied LOCA cannot overflow on the substrate and form a tough film and avoid any final curing in the subsequent step. As used herein, the term "the curing ratio" refers to conversion rate of UV-curable double bonds in formulations. A typical testing method is Fourier Transform Infrared Spectroscopy (FT-IR), which is widely used and well known in the industry.

Figure 3:
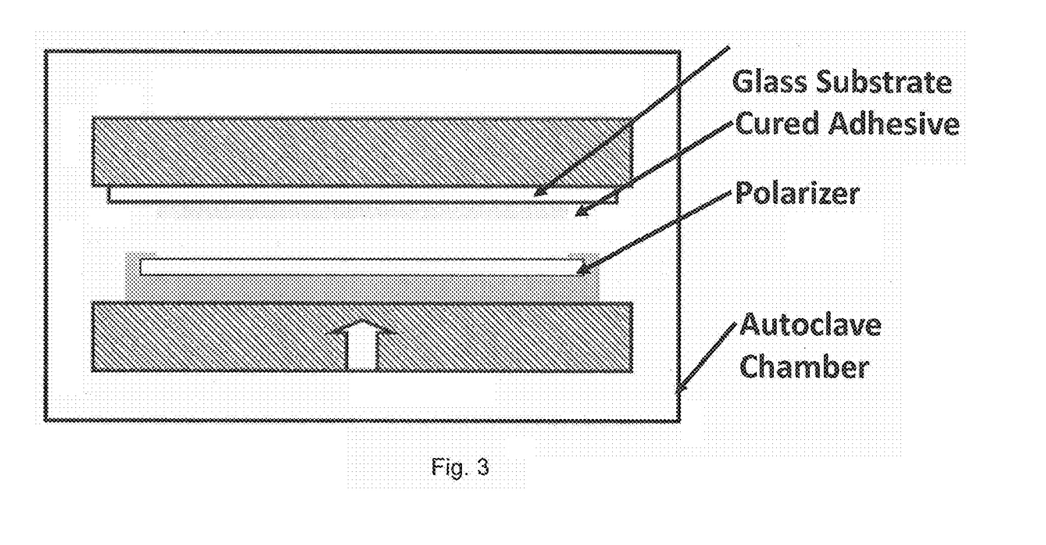
FIG. 3 depicts the attaching in step (c) of the laminating process according to the present invention.

After gelling/curing, as shown in FIG. 3, a base substrate is attached to the gelled adhesive layer under ambient condition or under vacuum condition in step (c). Vacuum conditions are especially preferred to guarantee the best possible bubble-free bonding. If vacuum conditions are used, then the vacuum level should preferably be around <about 100 Pa, preferably <about 10 Pa.

The present invention also provides a cured adhesive and an article, preferably laminated article produced from the adhesive composition as above or the laminating process as above.

In addition, the photo-curable LOCA adhesive composition, cured adhesive and article are suitable for the use for bonding or laminating parts on substrates, preferably on glass substrates, more preferably on assembling transparent or non-transparent parts of substrates, and used in the manufacture of mobile phones, tablet PCs, TVs, notebook PCs, digital cameras, photo frames, car navigations, outdoor displays, etc.

The present invention may be better understood with reference to the following examples.

EXAMPLES

Each component of the Examples mentioned below was added to a plastic container having a capacity of 150 g, and then the mixture was put into a SpeedMixer™ mixer produced by FlackTech Inc., dispersed and mixed for 5 minutes under a high stirring rate of from 2000 to 2500 rpm to make sure all the components are fully dissolved and obtain the adhesive composition.

Example 1

87.35 parts of polyacrylate Hitaloid 7927-19 (Tg value is around 9° C.), from Hitachi Chemical, which comprises an acrylate copolymer of 2-ethylhexyl acrylate and 4-acryloylmorpholine, having a weight average molecular weight of about 170000.

7.65 parts of 2-(2-ethoxyethoxy) ethyl acrylate (SR 256 from Satomer)

0.4 parts of pentaerythritol tetraacrylate (SR 295 from Sartomer)

1.0 parts of acryloyl morphiline (ACMO from Kohjin)

0.40 parts of 2,4-bis(dodecylthiomethyl)-6-methylphenol (Irganox 1726 from BASF)

0.80 parts of trimethylbenzoyl diphenylphosphine oxide (TPO from BASF)

2.40 parts of 1-hydroxycyclohexyl benzophenone (Irgcure 184 from BASF)

All parts are based on 100 parts by weight of the adhesive composition.

The results of uncured and cured adhesive composition as prepared are as follows:

Uncured properties:
Color: Transparent
Viscosity (Brookfield DV-II+Pro, CP52, 15 rpm): around 4,000 mPa·s/25° C.
Formulation can be well applied by slit coaters.
Cured properties:
Sh00 hardness (ASTM D2240): Sh00 33
Haze (ASTM D1003): <1.0%
Yellowing index, b* (ASTM E903): <1
Transmittance, % (ASTM E903): >98%

Figure 4:
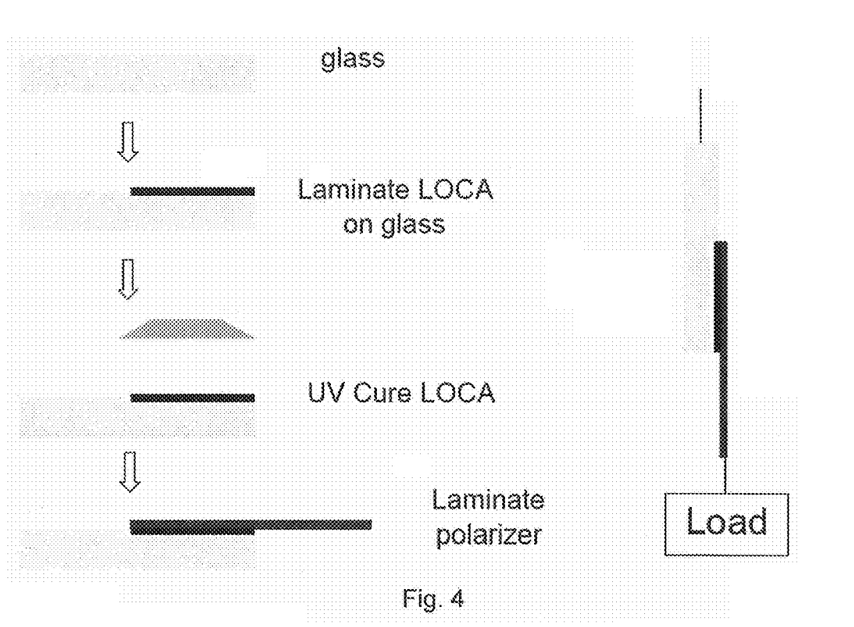
FIG. 4 depicts a schematic illustration of the shear adhesion failure temperature (SAFT) test.

The cured film is very tacky after curing by 3,000 mJ/cm² UVA (0.2 mm gap thickness). Shear adhesion failure temperature (SAFT) can reach 85° C. Below are detailed description on SAFT test as shown in FIG. 4: On a glass plate of 25.4 mm*101.5 mm*5 mm, the produced adhesive was laminated with gap thickness as 100µm, 25.4 mm width and 25.4 mm length via a slit coater (Manufacturer: Musashi, Mode: SM300S), and then cured with UV light source at intensity at around 150 mW/cm² UVA (Manufacturer: Loctite Corporation, Mode: UVALOC 1000) for 25 seconds. Then another substrate-polarizer (Manufacturer: Nitto, Mode: Hard Coating) was laminated manually and slightly pressed on the surface. The laminated specimens were placed vertically with a weight loading of 7.36 g/cm², and then put into a defined temperature (typically 85° C.)oven (Manufacturer: Espec, Mode: LHU-213). Record the results in 30 minutes and check if there is any shift for specimens. No shift means the pass of the SAFT test, and thus SAFT can reach the defined temperature.

Example 2

86.68 parts of polyacrylate Hitaloid 7927-19 (Tg value is around 9° C.), from Hitachi Chemical, which comprises an acrylate copolymer of 2-ethylhexyl acrylate and 4-acryloylmorpholine, having a weight average molecular weight of about 160000.
8.89 parts of 2-(2-ethoxyethoxy) ethyl acrylate (SR 256 from Satomer)
0.5 parts of acryloyl morphiline (ACMO from Kohjin)
0.44 parts of 2,4-bis(dodecylthiomethyl)-6-methylphenol (Irganox 1726 from BASF)
0.87 parts of trimethylbenzoyl diphenylphosphine oxide (TPO from BASF)
2.62 parts of 1-hydroxycyclohexyl benzophenone (Irgcure 184 from BASF)
All parts are based on 100 parts of the adhesive composition (by weight).
The results of uncured and cured adhesive composition as prepared are as follows:
Uncured properties:
Color: Transparent
Viscosity (Brookfield DV-II+Pro, CP52, 25rpm): around 2,600 mPa·s/25° C.
Formulation can be well applied by slit coaters.
Cured properties:
Sh00 hardness (ASTM D2240): Sh00 17
Haze (ASTM D1003): <1.0%
Yellowing index, b* (ASTM E903): <1
Transmittance, % (ASTM E903): >98%
The cured film is very tacky after curing by 3,000 mJ/cm$^2$ UVA (0.2 mm gap thickness).
Shear adhesion failure temperature can reach 85° C.

Example 3

83.20 parts of polyacrylate Hitaloid 7927-20 (Tg value is around 28° C.), from Hitachi Chemical, which comprises an acrylate copolymer of 2-ethylhexyl acrylate and 4-acryloylmorpholine, having a weight average molecular weight of about 160000.
6.0 parts of isobornyl acrylate (SR 506 from Satomer)
6.0 parts of benzyl acrylate (BZA from OSAKA ORGANIC CHEMICAL INDUSTRY LTD.)
0.50 parts of acryloyl morphiline (ACMO from Kohjin)
0.50 parts of tricyclodecane dimethanol diacrylate (SR 833 from Sartomer)
0.50 parts of 2,4-bis(dodecylthiomethyl)-6-methylphenol (Irganox 1726 from BASF)
0.80 parts of trimethylbenzoyl diphenylphosphine oxide (TPO from BASF)
2.50 parts of 1-hydroxycyclohexyl benzophenone (Irgcure 184 from BASF)
All parts are based on 100 parts of the adhesive composition (by weight).
The results of uncured and cured adhesive composition as prepared are as follows:
Uncured properties
Color: Transparent
Viscosity (Brookfield DV-II+Pro, CP52, 10 rpm): around 4,500 mPa·s/25° C.
Formulation can be well applied by slit coaters.
Cured properties
Sh00 hardness (ASTM D2240): Sh00 60
Haze (ASTM D1003): <1.0%
Yellowing index, la* (ASTM E903): <1
Transmittance, % (ASTM E903): >98%
Cured film is very tacky after curing by 3,000 mJ/cm$^2$ UVA (0.2 mm gap thickness).
Shear adhesion failure temperature can reach 85° C.

Example 4

60.00 parts of polyacrylate UV 29084 (Tg value is around −35° C.), from Henkel, which comprises an branched methacrylate copolymer of 2-ethylhexyl acrylate, 2-hydroethyl acrylate and isobutyl methacrylate grafted with caprolactone, having a weight average molecular weight of about 60000.
10.0 parts of isobornyl acrylate (SR 506 from Satomer)
2.0 parts of tricyclodecane dimethanol diacrylate (SR 833 from Sartomer)
3.0 parts of caprolactone acrylate (SR 495 from Sartomer)
24.0 parts of tetrahydrofurfuryl acrylate (SR 285 from Sartomer)
0.50 parts of trimethylbenzoyl diphenylphosphine oxide (TPO from BASF)
0.50 parts of 1-[4-(2-hydroxyethoxy)-phenyl]-2-hydroxy-2-methyl-1-propane-1-one (Irgcure 2959 from BASF)
All parts are based on 100 parts of the adhesive composition (by weight).
The results of uncured and cured adhesive composition as prepared are as follows:
Uncured properties
Color: Transparent
Viscosity (Brookfield DV-II+Pro, CP52, 1 rpm): around 65,000 mPa·s/25° C.
Formulation can be well applied by slit coaters.
Cured properties
Sh00 hardness (ASTM D2240): Sh00 45
Haze (ASTM D1003): <1.0%
Yellowing index, b* (ASTM E903): <1
Transmittance, % (ASTM E903): >98%
The cured film is very tacky after curing by 2,000mJ/cm$^2$ UVA (0.2 mm gap thickness).
Shear adhesion failure temperature can reach 80° C.

Example 5

74.00 parts of polyacrylate Hitaloid 7927-19 (Tg value is around 9° C.), from Hitachi Chemical, which comprises an acrylate copolymer of 2-ethylhexyl acrylate and 4-acryloylmorpholine, having a weight average molecular weight of about 170000.
6 parts of isobornyl acrylate (SR 506 from Satomer)
0.5 parts of acryloyl morphiline (ACMO from Kohjin)
6 parts of 2-(2-ethoxyethoxy) ethyl acrylate (SR 256 from Satomer)
9.57 parts of polyethylene glycol di-2-ethylhexoate (TegMer809 from Hallstar)
0.44 parts of 2,4-bis(dodecylthiomethyl)-6-methylphenol (Irganox 1726 from BASF)
0.87 parts of trimethylbenzoyl diphenylphosphine oxide (TPO from BASF)
2.62 parts of 1-hydroxycyclohexyl benzophenone (Irgcure 184 from BASF)
All parts are based on 100 parts of the adhesive composition (by weight).
The results of uncured and cured adhesive composition as prepared are as follows:
Uncured properties
Color: Transparent
Viscosity (Brookfield DV-II+Pro, CP52, 20 rpm): around 2,600 mPa·s/25° C.
Formulation can be well applied by slit coaters.

Cured properties
Sh00 hardness (ASTM D2240): Sh00 18
Haze (ASTM D1003): <1.0%
Yellowing index, b* (ASTM E903): <1
Transmittance, % (ASTM E903): >98%
Cured film is very tacky after curing by 4,200 mJ/cm² UVA (0.2 mm gap thickness).
Shear Adhesion Failure Temperature can reach 70° C.

Example 6

77.50 parts of polyacrylate Hitaloid 7927-20 (Tg value is around 9° C.), from Hitachi Chemical, which comprises an acrylate copolymer of 2-ethylhexyl acrylate and 4-acryloylmorpholine, having a weight average molecular weight of about 160000.
6 parts of isobornyl acrylate (SR 506 from Satomer)
6 parts of 2-(2-ethoxyethoxy) ethyl acrylate (SR 256 from Satomer)
0.5 parts of acryloyl morphiline (ACMO from Kohjin)
6 parts of polyethylene glycol di-2-ethylhexoate (TegMer809 from Hallstar)
0.51 parts of 2,4-bis(dodecylthiomethyl)-6-methylphenol (Irganox 1726 from BASF)
0.87 parts of trimethylbenzoyl diphenylphosphine oxide (TPO from BASF)
2.62 parts of 1-hydroxycyclohexyl benzophenone (Irgcure 184 from BASF)
All parts are based on 100 parts of the adhesive composition (by weight).
The results of uncured and cured adhesive composition as prepared are as follows:
Uncured properties
Color: Transparent
Viscosity (Brookfield DV-II+Pro, CP52, 20 rpm): around 2,800 mPa·s/25° C.
Formulation can be well applied by slit coaters.
Cured properties
Sh00 hardness (ASTM D2240): Sh00 35
Haze (ASTM D1003): <1.0%
Yellowing index, b* (ASTM E903): <1
Transmittance, % (ASTM E903): >98%
The cured film is very tacky after curing by 4,000 mJ/cm² UVA (0.2 mm gap thickness).
Shear Adhesion Failure Temperature can reach 85° C.

Example 7

60.50 parts of polyacrylate UV 29754 (Tg value is around 0° C.), from Henkel, which comprises an branched methacrylate copolymer of 2-ethylhexyl acrylate, 2-hydroethyl acrylate and isobutyl methacrylate grafted with caprolactone, having a weight average molecular weight of about 60000.
19.0 parts of isobornyl acrylate (SR 506 from Satomer)
1 part of 2-hydroethyl acrylate (2-HEA from Osaka Organic Chemical Industry Ltd.)
4.0 parts of tricyclodecane dimethanol diacrylate (SR 833 from Sartomer)
7.2 parts of 2-ethylhexyl acrylate
7.3 parts of 2-(2-ethoxyethoxy) ethyl acrylate (SR256 from Sartomer)
0.70 parts of trimethylbenzoyl diphenylphosphine oxide (TPO from BASF)
0.30 parts of 1[4-(2-hydroxyethoxy)-phenyl]-2-hydroxy-2-methyl-1-propane-1-one (Irgcure 2959 from BASF)
All parts are based on 100 parts of the adhesive composition (by weight).
The results of uncured and cured adhesive composition as prepared are as follows:
Uncured properties
Color: Transparent
Viscosity (Brookfield DV-II+Pro, CP52, 10 rpm): around 5,000 mPa·s/25° C.
Formulation can be well applied by slit coaters.
Cured properties
Sh00 hardness (ASTM D2240): Sh00 25
Haze (ASTM D1003): <1.0%
Yellowing index, b* (ASTM E903): <1
Transmittance, % (ASTM E903): >98%
The cured film is very tacky after curing by 3,000 mJ/cm² UVA (0.2 mm gap thickness).
Shear adhesion failure temperature can reach 85° C.

Example 8

87.35 parts of polyacrylate Hitaloid 7927-19 (Tg value is around 9° C.), from Hitachi Chemical, which comprises an acrylate copolymer of 2-ethylhexyl acrylate and 4-acryloylmorpholine, having a weight average molecular weight of about 170000
8.05 parts of 2-(2-ethoxyethoxy) ethyl acrylate (SR 256 from Satomer)
0.8 parts of pentaerythritol tetraacrylate (SR 295 from Sartomer)
1.0 parts of acryloyl morphiline (ACMO from Kohjin)
0.40 parts of 2,4-bis(dodecylthiomethyl)-6-methylphenol (Irganox 1726 from BASF)
2.40 parts of 1-hydroxycyclohexyl benzophenone (Irgcure 184 from BASF)
All parts are based on 100 parts of the adhesive composition (by weight).
The results of uncured and cured adhesive composition as prepared are as follows:
Uncured properties
Color: Transparent
Viscosity (Brookfield DV-II+Pro, CP52, 15 rpm): around 4,000 mPa·s/25° C.
Formulation can be well applied by slit coaters.
Cured properties
Sh00 hardness (ASTM D2240): Sh00 42
Haze (ASTM D1003): <1.0%
Yellowing index, b* (ASTM E903): <1
Transmittance, % (ASTM E903): >98%
The cured film is very tacky after curing by 5,000 mJ/cm² UVA (0.2 mm gap thickness).
Shear adhesion failure temperature can reach 85° C.

As demonstrated above, after preparation, all of the uncured adhesive examples are transparent, and remain better optical performance compared to traditional optically clear tapes, which easily generates air gaps and bubbles. The prepared LOCAs exhibited a suitable viscosity for the application by a slit coater, and therefore is convenient and easy to be used for the assembly of optical devices, such as displays. Surprisingly, the LOCAs has a high tackiness after curing according to the curing method of the present invention, and the LOCAs are easy to control the edge flow through a high curing ratio of at least 95% on substrates, and thus avoid using a dam for filling LOCAs. In the laminating process using the prepared LOCAs, the LOCAs applied by a slit coater do not overflow on the substrate, form a tough PSA film and avoid any final curing in the subsequent step.

In addition, the cured LOCAs according to the present invention exhibit good hardness, haze, yellowness, transmittance, and thermal stability, which ensure that the photo-curable LOCA composition are very suitable to be used in the assembly of optical devices, such as mobile phones, tablet PCs, TVs, notebook PCs, digital cameras, photo frames, car navigations, outdoor displays, etc.

Furthermore, those of ordinary skill in the art will appreciate that the foregoing description is by way of example only, and is not intended to limit the invention so further described in such appended claims.

What is claimed is:

1. A photo-curable liquid optically clear adhesive composition, comprising:
   (a) at least one (meth)acrylic copolymer having a weight average molecular weight of from about 10000 to about 600000 g/mol and a glass transition temperature of from about −40° C. to about 40° C., wherein the (meth)acrylic copolymer is a reaction product of monomers selected from the group consisting of a (meth) acrylamide monomer, a hydroxyl group containing (meth)acrylic monomer, an $C_1$-$C_{20}$ alkyl (meth)acrylate monomer and combinations thereof,
   (b) at least one non-functional (meth)acrylic monomer,
   (c) at least one photo initiator, and
   (d) at least one functional (meth)acrylic monomer,
   wherein the adhesive has a Brookfield viscosity at 25° C. of about 1000 to about 100000 mPa·s, and, when photo-cured to a cure ratio of at least 95%, is tacky and capable of being laminated to a surface.

2. The adhesive composition according to claim 1, wherein the non-functional (meth)acrylic monomer (b) is selected from the group consisting of mono-, di-, tri- and tetra-(meth)acrylic monomers and combinations thereof.

3. The adhesive composition according to claim 2, wherein the mono-, di-, tri- and tetra-(meth)acrylic monomers are selected from the group consisting of n-butyl (meth) acrylate, iso-butyl (meth) acrylate, 2-ethylhexyl (meth) acrylate, iso-decyl (meth) acrylate, iso-octyl (meth) acrylate, iso-stearyl (meth)acrylate, lauryl (meth)acrylate, stearyl (meth)acrylate, isobornyl (meth)acrylate, caprolactone (meth)acrylate, N-(meth)acryloyl morpholine, dicyclopentenyloxyethyl (meth) acrylate, dicyclopentadienyl (meth) acrylate, 2-(2-ethoxyethoxy) ethyl (meth)acrylate, methoxy polyethylene glycol (meth)acrylate, cyclohexyl (meth)acrylate, 2-phenoxyethyl (meth)acrylate, benzyl (meth) acrylate, tetramethylene dimethacrylate, ethylene dimethacrylate, cyclohexanedimethylol di(meth)acrylate, dicyclopentadienedimethylol di(meth)acrylate, 1,6-hexanediol di(meth)acrylate, nonanediol di(meth)acrylate, tricyclodecane dimethanol di(meth)acrylate, 1,4-butanediol diacrylate, trimethylolpropane tri(meth)acrylate, pentaerythritol tri(meth)acrylate, pentaerythritol tetra(meth)acrylate, and combinations thereof.

4. The adhesive composition according to claim 1, wherein the (meth)acrylamide monomer of component (a) is selected from the group consisting of caprolactone (meth) acrylate, N,N-dimethyl (meth) acrylamide, N-methyl (meth) acrylamide, N-isopropyl (meth)acrylamide, N-butoxymethyl (meth)acrylamide, N-t-butyl (meth)acrylamide, N-phenyl (meth)acrylamide and N-methylol (meth)acrylamide, N-(meth)acryloylmorpholine, N-(meth)acryloylpyrrolidone, N-(meth)acryloylpiperidine, N-(meth)acryloylpyrrolidine and N-(meth) acryloyl-4-piperidone and combinations thereof.

5. The adhesive composition according to claim 1, wherein the $C_1$-$C_{20}$ alkyl (meth)acrylate monomer of component (a) is selected from the group consisting of methyl (meth)acrylate, n-butyl (meth)acrylate, iso-butyl (meth) acrylate, 2-ethylhexyl (meth) acrylate, iso-decyl (meth)acrylate, iso-octyl (meth)acrylate, iso-stearyl (meth)acrylate, lauryl (meth)acrylate, n-stearyl (meth)acrylate, isobornyl (meth) acrylate, dicyclopentenyloxyethyl (meth)acrylate, 2-(2-ethoxyethoxy)ethyl (meth)acrylate, cyclohexyl (meth) acrylate and combinations thereof.

6. The adhesive composition according to claim 1, wherein the hydroxyl group containing(meth)acrylic monomers of component (a) are selected from the group consisting of hydroxylalkyl (meth)acrylates, the ethoxylated and propoxylated derivatives thereof, the adducts thereof with lactones and polyalkoxy monohydroxyl mono(meth)acrylates, and combinations thereof.

7. The adhesive composition according to claim 1, wherein the (meth)acrylic copolymer is a reaction product of the monomers selected from at least two of the group consisting of 2-ethylhexyl (meth)acrylate, N-(meth)acryloyl morpholine, isobutyl (meth)acrylate and 2-hydroxyethyl (meth)acrylate.

8. The adhesive composition according to claim 1, wherein the (meth)acrylic copolymer has a weight average molecular weight of from about 30000 to about 300000 g/mol.

9. The adhesive composition according to claim 1, wherein the (meth)acrylic copolymer has a glass transition temperature of from about −35° C. to about 30° C.

10. The adhesive composition according to claim 1, wherein the amount of component (a) is from about 30 to about 95% by weight, based on the total weight of the adhesive composition.

11. The adhesive composition according to claim 1, wherein the non-functional (meth)acrylic monomer (b) is selected from the group consisting of 2-(2-ethoxyethoxy) ethyl (meth) acrylate, pentaerythritol tetra(meth)acrylate, isobornyl (meth)acrylate, benzyl (meth)acrylate, 2-ethylhexyl (meth)acrylate, tricyclodecane dimethanol di(meth) acrylate, and combinations thereof.

12. The adhesive composition according to claim 1, wherein the amount of non-functional (meth)acrylic monomer (b) is from about 2 to about 60% by weight based on the total weight of the adhesive composition.

13. The adhesive composition according to claim 1, wherein the photo initiator (c) is selected from the group consisting of acetophenones, acylphosphine oxides, benzoin ethers, and combinations thereof.

14. The adhesive composition according to claim 1, wherein the amount of photo initiator (c) is from about 0.02 to about 5% by weight based on the total weight of the adhesive composition.

15. The adhesive composition according to claim 1, wherein the functional (meth)acrylic monomer (d) is selected from (meth)acrylic monomers having at least one functional group selected from a hydroxyl, an amide, a carboxyl, a tetrahydrofurfuryl, a morpholine, an amino, and an isocyanate group.

16. The adhesive composition according to claim 1, wherein the functional (meth)acrylic monomer (d) is selected from (meth)acryloyl morphiline, caprolactone acrylate, tetrahydrofurfuryl acrylate, and combinations thereof.

17. The adhesive composition according to claim 1, wherein the amount of functional (meth)acrylic monomer (d) is about 0.5 to about 30% by weight based on the total weight of the adhesive composition.

18. The adhesive composition according to claim 1, wherein the Brookfield viscosity of the adhesive composition at 25° C. is from about 1500 to about 50000 mPa·s according to ASTM D1084.

19. The adhesive composition according to claim 1, wherein the hydroxyl group containing (meth)acrylic monomers of component (a) are selected from the group consisting of hydroxylalkyl (meth)acrylates and ethoxylated and propoxylated derivatives thereof, adducts thereof with lactones and polyalkoxy monohydroxyl mono(meth)acrylates and ethoxylated and/or propoxylated derivatives thereof, and adducts thereof with lactones and polyalkoxy monohydroxyl mono(meth)acrylates, and combinations thereof.

20. The adhesive composition according to claim 1, wherein the hydroxyl group containing (meth)acrylic monomers of component (a) are selected from the group consisting of hydroxylalkyl (meth)acrylates having from about 1 to about 20 carbon atoms in the alkyl group and ethoxylated and/or propoxylated derivatives thereof, β-carboxyethyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, (meth)acrylates of glycidyl versatate, and combinations thereof.

21. The adhesive composition according to claim 1, wherein the (meth)acrylic copolymer has a weight average molecular weight of from about 50000 to about 200000 g/mol.

22. The adhesive composition according to claim 1, wherein the amount of component (a) is from about 50 to about 90% by weight, based on the total weight of the adhesive composition.

23. The adhesive composition according to claim 1, wherein the amount of non-functional (meth)acrylic monomer (b) is from about 10 to about 50% by weight, based on the total weight of the adhesive composition.

24. The adhesive composition according to claim 1, wherein the photo initiator (c) is selected from the group consisting of 2-hydroxyl-2-methylpropiophenone, 1-hydroxycyclohexyl phenyl ketone, bis(2,4,6-trimethylbenzoy) phenylphosphine oxide, benzoin methyl ether, benzoin ethyl ether, and combinations thereof.

25. The adhesive composition according to claim 1, wherein the amount of photo initiator (c) is from about 0.5 to about 4.0% by weight, based on the total weight of the adhesive composition.

26. The adhesive composition according to claim 1, wherein the amount of functional (meth)acrylic monomer (d) is about 1 to about 10% by weight, based on the total weight of the adhesive composition.

27. An article comprising the adhesive composition according to claim 1.

28. A cured adhesive produced from the adhesive composition according to claim 1.

29. An article comprising the adhesive composition of the cured adhesive according to claim 28.

30. A curing method, comprising curing the photo-curable liquid optically clear adhesive composition according to claim 1 by exposure to electromagnetic radiation having a wavelength ranging from 200 nm to 500 nm to a curing ratio of at least about 95%.

31. A laminating process for binding a top substrate to a base substrate, comprising:
    (a) applying the photo-curable liquid optically clear adhesive composition according to claim 1 onto the top side of the base substrate,
    (b) curing the photo-curable liquid optically clear adhesive composition by exposure to electromagnetic radiation having a wavelength ranging from 200 nm to 500 nm to a curing ratio of at least about 95%, and
    (c) attaching the top substrate on the cured adhesive layer of step (b).

* * * * *